(12) United States Patent
Hansen

(10) Patent No.: US 7,293,979 B2
(45) Date of Patent: Nov. 13, 2007

(54) MOLDING DEVICE

(76) Inventor: Bernd Hansen, Talstr. 22-30, 74429 Sulzbach-Laufen (DE)

(\*) Notice: Subject to any disclaimer, the term of this patent is extended or adjusted under 35 U.S.C. 154(b) by 5 days.

(21) Appl. No.: 10/546,609

(22) PCT Filed: Jan. 24, 2004

(86) PCT No.: PCT/EP2004/000596

§ 371 (c)(1),
(2), (4) Date: Aug. 23, 2005

(87) PCT Pub. No.: WO2004/091893

PCT Pub. Date: Oct. 28, 2004

(65) Prior Publication Data

US 2006/0172027 A1    Aug. 3, 2006

(30) Foreign Application Priority Data

Apr. 17, 2003    (DE) ................. 103 17 712

(51) Int. Cl.
*B29C 49/56*    (2006.01)

(52) U.S. Cl. ............... 425/524; 425/451.4; 425/451.5; 425/451.9; 425/540; 425/541

(58) Field of Classification Search ............ 425/541, 425/524, 540, 451.4, 451.9, 451.5; B29C 49/56
See application file for complete search history.

(56) References Cited

U.S. PATENT DOCUMENTS

| 3,877,861 | A |   | 4/1975  | Kiefer et al. |
| 3,883,286 | A |   | 5/1975  | Kinslow, Jr. et al. |
| 5,478,229 | A | * | 12/1995 | Kato et al. .............. 425/541 |
| 5,962,039 | A | * | 10/1999 | Katou et al. ............ 425/541 |
| 6,102,685 | A | * | 8/2000  | Miura et al. ............ 425/541 |

FOREIGN PATENT DOCUMENTS

| DE | 197 07 292 A1 | 8/1998  |
| DE | 197 37 697 A1 | 3/1999  |
| DE | 198 11 106 A1 | 9/1999  |
| DE | 199 26 329 A1 | 12/2000 |

\* cited by examiner

*Primary Examiner*—Robert B. Davis
(74) *Attorney, Agent, or Firm*—Roylance, Abrams, Berdo & Goodman, L.L.P.

(57) ABSTRACT

A molding device moves at least one molding tool (10), especially for generating head geometries in plastic containers, by a link motion (22). The link motion brings the respective molding tool (10) into the closed position at least for closing the tool. This motion (22) is actuated by a drive (24), allowing for a novel drive and kinematic concept for the respective molding tool to completely avoid hydraulic drive means. The drive is preferably an electric drive, especially a step motor.

21 Claims, 3 Drawing Sheets

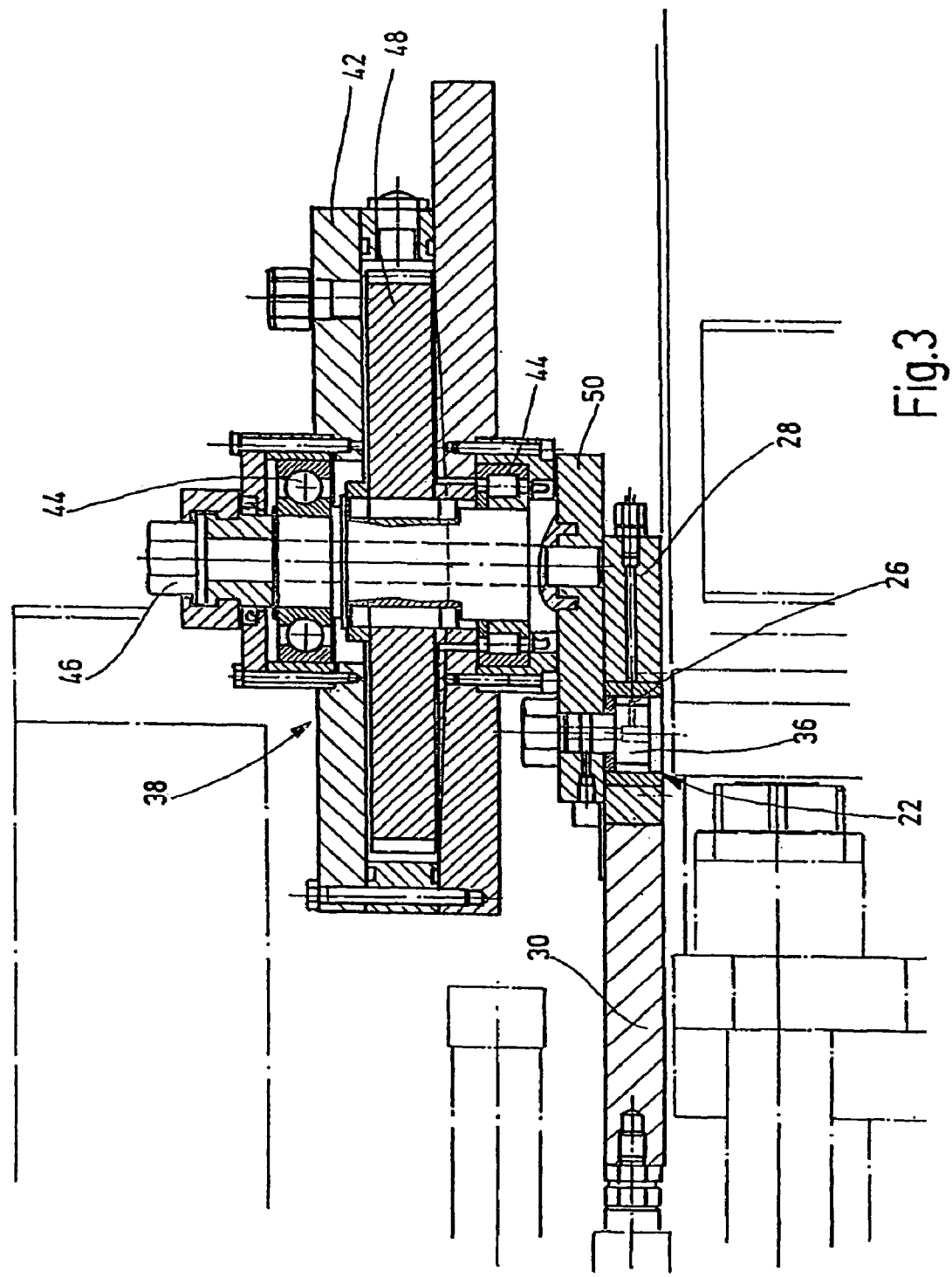

MOLDING DEVICE

FIELD OF THE INVENTION

The present invention relates to a molding device for forming heads of plastic containers. A molding tool is movable between a closing position closing a mold and an opening position opening a mold. A link motion control element is coupled to and moves the molding tool into the closing position. A drive is coupled to and actuates the link motion control element.

BACKGROUND OF THE INVENTION

Processes and devices for production of containers are known in the prior art (DE 199 26 329 A1). A hose of plasticized plastic material is extruded into a molding mechanism, with one end of the hose is closed by heat sealing. As a result of generation of a pneumatic pressure gradient acting on the hose, the hose is expanded and is applied to the shaping wall of the molding mechanism to form the container. The plastic container is then filled under sterile conditions by a charging mandrel inside the molding mechanism, and then hermetically sealed after removal of the charging mandrel to form a specified head geometry. Two head shaping jaws may be moved in the opposite direction by hydraulic drive means toward each other to obtain a closing position and away from each other into opening positions. The head geometries to be generated by the head jaws regularly also comprise the neck component of the plastic container, also in ampule form. The neck component is closed by a separation point, but may be opened for a fluid removal process as soon as the head piece is separated at the separation point by a toggle part molded on it and removed from the plastic container.

Such processes have been disclosed in a plurality of embodiments, and are widely used in packing systems for liquid or paste products, for example, in the disclosed "bottelpack7" system.

The hydraulic drive systems regularly employed in practical applications for the respective feed movement of the molding tool present problems in that any leakage may result in fouling with the fluid. The leakage results in problems, especially when the shaping machines are used for plastic containers in the pharmaceutical and food packaging fields and in medical technology in general. The maintenance cost is also increased. The hydraulic drive systems do not reach the desired or high cycle frequencies for mass production for the sake of precise positioning of the molding tools.

SUMMARY OF THE INVENTION

An object of the present invention is to provide a molding device for moving at least one molding tool permitting application of modern drive concepts, such as electric or pneumatic drives. The maintenance cost of such drives is reduced, and permit especially high rates of output of goods to be produced, such as plastic containers, with high positioning accuracy for the molding tools.

This object is obtained according to the present invention by a molding device possessing a link motion control element for moving at least one molding tool, especially one for generation of head geometries in plastic containers. This element moves the respective molding tool to a closing position at least for closing the mold. The link motion control element is actuatable by a drive. On the basis of the link motion control element, a novel drive and movement concept is presented for the respective molding tool, one which makes it possible to dispense with hydraulic drive means entirely. Preferably, an electric or pneumatic drive is employed as the drive means. The link motion control element may, however, continue to be actuated by a hydraulic drive if the respective application appears to call for it and rigid requirements have not been set for sterile filling or clean room qualities.

The molding device of the present invention with the drivable link motion control element for a closing movement of the molding device permits uniform, safe, and position-accurate driving of the respective molding tool, and entails only a small maintenance expenditure. The link motion control element may be employed to execute a plurality of opening and closing processes in rapid sequence. This rapid sequence results in high output of goods to be produced, in particular those in the form of blow-molded plastic containers filled under sterile conditions.

In a preferred embodiment of the molding device of the present invention, the link motion control element has a slot guide in a feed component engaged by the actuating member. The actuating member may be moved into an opening position and a closing position of the molding tool by a rotation element actuated by the drive. Safe and precise positioning control is achieved as a result, along with clearly defined specific closing forces specified by the link motion control element.

In another especially preferred embodiment of the molding device according to the present invention, the feed element operates in conjunction with a rail-guided slide component which may be non-positively moved into the closing position of the molding device by the feed element. Preferably, the slide component may be moved together with the molding tool into the closing position of the latter, it being possible to reset the molding tool to its opening position by a reset means. A rigid machine configuration for the molding device is accomplished by the rail guide. Obstructions in operation are reliably excluded by the separate reset movement of molding tool and slide component.

In another preferred embodiment of the molding device according to the present invention, the closing force for the molding tool may be specified by a central adjusting means, preferably in the form of an energy accumulator. Pressure spring elements, such as disk springs or the like, are suitable for use as energy accumulators. The closing force of the link motion control element may be definitely limited by the adjusting means independently of the force applied.

In another especially preferred embodiment of the molding device according to the present invention, the molding tools opposite each other in pairs may be moved by a link motion control element synchronously into their closing position. Preferably, two link motion control elements of one slide component may be actuated by gearing actuated by the drive. In addition, preferably two slide components each with two link motion control elements may be moved in the opposite direction toward or away from each other by the rail guide. In this way a total of four molding tools with molding geometries mounted in sequence may be actuated to operate synchronously in pairs to generate several head geometries.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 3 is a side elevational view of the molding device in section taken along line II-II in FIG. 1.

DETAILED DESCRIPTION OF THE INVENTION

Figure 1:
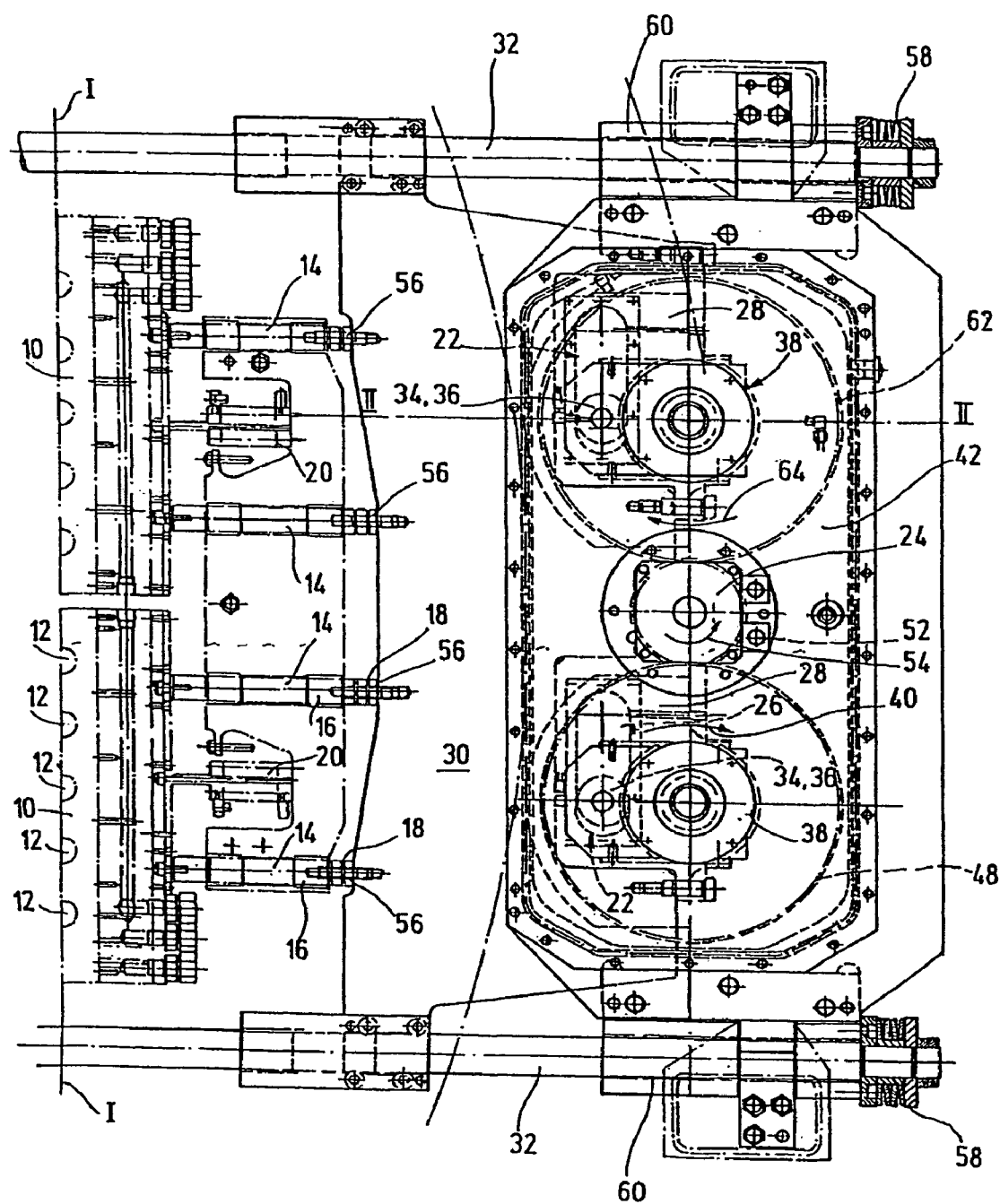
FIG. 1 is a top plan view of part of a molding device according to an embodiment of the present invention, with molding tool in closing position.

First a part of the molding device for moving a molding tool 10 is to be described in detail with reference to the lower section of the illustration in FIG. 1. On its free front side, the molding tool 10 has trough-like recesses 12 forming mold halves for generation of head geometries for plastic containers (not shown). To generate the respective head geometries, the molding tool 10 operates in conjunction with a corresponding molding tool 10a with recesses 12, as shown, by way of example, at the bottom of FIG. 2 as viewed in the line of sight. The molding tool 10 is connected on its side opposite the recesses 12 to two adjusting components 14 the length of which may be adjusted by at least one stop component 16, so that the adjusting components 14 provide a variable contact surface 18. As a result, the molding tool 10 may be oriented on its free front side along a closing separation line I-I. In addition, the molding tool 10 may be reset independently, as is shown in FIG. 2, by reset means 20, as, for example, means in the form of a conventional pneumatic cylinder, along a guide (not shown), from the closing position shown in FIG. 1.

In addition, the molding device has, for the purpose of moving the molding tool 10, a link motion control element 22 by which the respective molding tool 10 may be actuated along the closing separation line I-I for the purpose of closing the mold. It is possible to actuate the link motion control element 22 by a drive 24, preferably one in the form of an electric motor, e.g., an electric step motor, actuating gears. For this purpose, the link motion control element 22 has a slot guide 26 in a feed component 28. This feed component 28 is integrated into a slide component 30, and is movable together with it into the closing and opening directions of the molding tool 10 along two rail guides 32. The slot guide 26 is mounted to move transversely to the rail guide 32 and to the direction of feed of the molding tool 10.

The slot guide 26 is engaged by an actuating member 34 in the form of a cam roller 36 (see FIG. 3). The function of pivoting of the actuating member 34 or cam roller 36 is performed by a rotation component 38 driven by a drive 24. This rotation component 38 permits pivoting of the actuating member 34 in the direction indicated by the arrow 40, as seen in FIG. 1, in order to move the feed component 28, together with the slide component 30, from its closed position shown in FIG. 1 backward to an opening position as shown in FIG. 2. For the purpose of movement in the opposite direction into the closing position, the feed component 28, together with the slide component 30, is to be fed in the direction opposite that of the arrow 40 by an appropriate pivoting movement by the actuating member 34 (cam roller) in the direction of the closing separation line I-I.

The structure of the rotation component 38 is illustrated in greater detail in FIG. 3. First, the rotation component 38 is received so as to be stationary in a plate-shaped machine mounting support 42 which extends between the two rail guides 32. A vertically oriented drive shaft 46 is rigidly connected to a toothed rim or gear 48, is driven by this rim, and is mounted in this machine mounting support 42 so as to be rotatable by an appropriate roller bearing 44. On the lower side of the drive shaft 46, and accordingly below the roller bearing 44, a lever piece 50 is rigidly connected to the drive shaft. The cam roller 36, which can rotate freely in the lever piece 50, extends through this lever piece 50 on its free left front side as viewed in the direction of FIG. 3. The slot guide 26 is mounted below the lever piece 50 in the feed component 28, which in turn is an integral component of the slide component 30. The teeth of the driving toothed rim or gear 52, which may be driven by the electric drive 24, in the form of a step motor, for example, mesh with the teeth of the toothed rim or gear 48. The drive direction is indicated by an arrow 54, the molding tool 10 being moved backward into its opening position in the respective direction.

Figure 2:
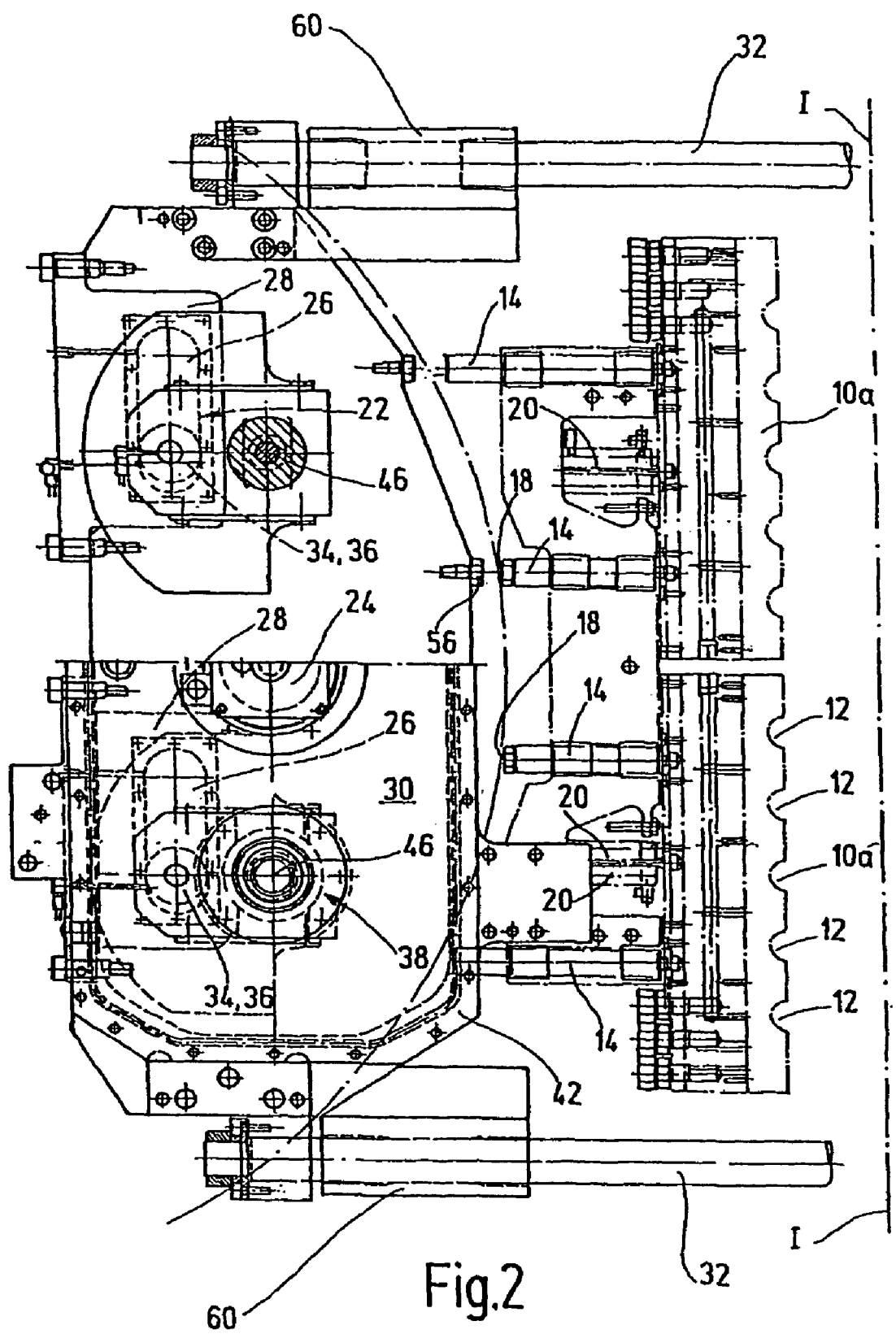
FIG. 2 is a top plan view of part of the molding device with molding tool in the opening position, the components of the molding device being juxtaposed along closing separation line I-I of FIG. 1 to form the molding device as a whole.

On its free front side, the slide component 30 has carrier components 56 which carry the molding tool configured as a sort of movement slide as the molding tool moves into its closing position along the closing separation line I-I by the adjusting components 14 and into the closing position opposite the direction of movement of the opposite molding tool 10a if the latter moves into its closing position along the closing separation line I-I as shown in FIG. 1. In order to selectively adjust the closing forces, on the one free end of each rail guide 32, central adjusting means in the form of a disk spring package 58 is mounted. Each spring package acts on the plate-like machine mounting support 42 mounted by end guides 60 so as to be movable longitudinally on the rail guides 32. If the closing forces now become too high along the closing separation line I-I, the entire configuration of molding tool 10 with slide component 30 and machine mounting support 42 may be reset backward against the action of the disk spring package 58. Consequently, safety is also provided if a machine collision unintentionally occurs, especially in the area of the molding tools 10, 10a.

If, as illustrated in FIG. 1, driving toothed rim 52 with toothed rim or gear 48 is driven in the direction indicated by arrows 54 and 40 by drive 24, the slide component 30 moves back to its initial position as shown in FIG. 2. The feed component 28 also moves into the position to the rear, with the cam roller 36 pivoting 180° backward from the position shown in FIG. 1. The carrier components 56 of the slide component 30 are accordingly moved away from the contact surface 18 by the adjusting components 14. The respective molding tool 10, 10a is returned by the pneumatic cylinder 20 as reset means to the opening position, and is then available for another closing process. The pair of molding tools 10, 10a positioned opposite each other is actuated synchronously by the respective link motion control element 22 of the pair for a closing process for the purpose of executing a molding process. Consequently, the drives 24 for both molding tools 10, 10a are actuated synchronously in common by a central control unit (not shown). The respective synchronous actuation also facilitates ejection of the plastic container by its head component produced by the molding tools 10, 10a. In view of the comparable structure of the two components illustrated in FIGS. 1 and 2, the reference numbers used in FIG. 1 are used correspondingly in FIG. 2. In principle, however, the possibility also exists of using the link motion control element 22 to design only one molding tool 10 to be movable and thus of moving the molding tool 10 in relation to a stationary molding tool (not shown) for a molding process. In any event the molding device as described may be used to reach very high cycle frequencies, and thus, production speeds for plastic containers (not shown). In addition, precise positioning of the respective molding tool 10, 10a by the link motion control element 22 is also possible.

In order to achieve a still higher output rate at least one other molding tool 10 is provided which is mounted in tandem in a row and may be actuated by the central drive 24 as described by a corresponding link motion control element 22. Consequently, the configuration as described shown in FIG. 1, above the drive 24 and the other toothed rim or gear 62 may be actuated along the arrow 64 if the slide component 30 is to be moved from its front position shown in FIG. 1 to its rear position shown in FIG. 2. The slot guide 26 accordingly is also oriented in the same direction as described. Consequently, for a longitudinal operating process, the cam roller 36 rolls along a circular path around the drive shaft 46 and, in the process, carries feed components 28 and 30 along in longitudinal movement in parallel with the two rail guides 32. The transverse position of the slot guide 26 as shown in FIGS. 1 and 2 remains unchanged. Since maximum force restriction by the respective disk spring package 58 as adjusting means is effected on one side of the rail guide 32, the respective configuration need not be provided in the case of the plate-shaped machine mounting support 42 shown in FIG. 2.

While one embodiment has been chosen to illustrate the invention, it will be understood by those skilled in the art that various changes and modifications can be made therein without departing from the scope of the invention as defined in the appended claims.

What is claimed is:

1. A molding device for forming heads of plastic containers, comprising:
   at least one molding tool movable between a closing position closing a mold and an opening position opening the mold;
   a link motion control element including a feed component with a guide slot therein, an actuating member received in said guide slot and a rotation component actuating and engaging said actuating member to positions corresponding to said opening and closing positions of said molding tool;
   a slide component slidably mounted on and guided by rails to be moved non-positively by said feed component into said closing position with said molding tool;
   reset means coupled to said molding tool for moving said molding tool to said opening position independently of said slide component; and
   a drive coupled to said rotation component for rotation thereof.

2. A molding device according to claim 1 wherein a central adjusting means is coupled to said molding tool to set a maximum closing force thereof.

3. A molding device according to claim 2 wherein said central adjusting means is an energy accumulator.

4. A molding device according to claim 1 wherein a second molding tool is mounted for movement opposite said at least one molding tool, and is coupled to and synchronously moved by another link motion control element into a closing position thereof.

5. A molding device according to claim 4 wherein each of said link motion control elements are driven by a gear of a slide component actuated by said drive.

6. A molding device according to claim 5 wherein said slide components with the respective link motion control elements are movable toward and away from one another by respective rail guides.

7. A molding device according to claim 1 wherein said drive is electrically operated.

8. A molding device according to claim 7 wherein said drive is an electric step motor.

9. A molding device according to claim 1 wherein said drive is pneumatically operated.

10. A molding device for forming heads of plastic containers, comprising:
    at least one molding tool movable between a closing position closing a mold and an opening position opening the mold;
    a link motion control element coupled to and moving said molding tool into said closing position;
    a drive coupled to and actuating said link motion control element; and
    a central adjusting means coupled to said molding tool to set a maximum closing force thereof.

11. A molding device according to claim 1 wherein said central adjusting means is an energy accumulator.

12. A molding device according to claim 1 wherein said link motion control element includes a feed component with a guide slot therein, an actuating member received in said guide slot and a rotation component actuating and engaging said actuating member to positions corresponding to said opening and closing positions of said molding tool.

13. A molding device according to claim 12 wherein a slide component slidable is mounted on and guided by rails to be moved non-positively by said feed component into said closing position with said molding tool.

14. A molding device according to claim 10 wherein a second molding tool is mounted for movement opposite said at least one molding tool, and is coupled to and synchronously moved by another link motion control element into a closing position thereof.

15. A molding device according to claim 14 wherein each of said link motion control elements are driven by a gear of a slide component actuated by said drive.

16. A molding device according to claim 15 wherein said slide components with the respective link motion control elements are movable toward and away from one another by respective rail guides.

17. A molding device according to claim 10 wherein said drive is electrically operated.

18. A molding device according to claim 17 wherein said drive is an electric step motor.

19. A molding device according to claim 10 wherein said drive is pneumatically operated.

20. A molding device for forming heads of plastic containers, comprising:
    at least one molding tool movable between a closing position closing a mold and an opening position opening the mold;
    a link motion control element including a feed component with a guide slot therein, an actuating member received in said guide slot and a rotation component actuating and engaging said actuating member to positions corresponding to said opening and closing positions of said molding tool;
    a slide component slidable mounted on and guided by rails to be moved non-positively by said feed component into said closing position with said molding tool;
    a drive coupled to said rotation component for rotation thereof; and a second molding tool mounted for movement opposite said at least one molding tool, and coupled to and synchronously moved by another link motion control element into a closing position thereof, each of said link motion control elements being driven by a gear of a slide component actuated by said drive.

21. A molding device according to claim 20 wherein said slide components with the respective link motion control elements are movable toward and away from one another by respective rail guides.

* * * * *